United States Patent [19]

Seeger et al.

[11] Patent Number: 4,598,732

[45] Date of Patent: Jul. 8, 1986

[54] GATE VALVE HAVING INTERNAL COOLING STRUCTURE

[76] Inventors: Josef Seeger, Lindenbergskamp 8; Wilhelm Kuckertz, Meroder Str. 14, both of 5160-Düren, Fed. Rep. of Germany

[21] Appl. No.: 675,065

[22] Filed: Nov. 26, 1984

[30] Foreign Application Priority Data

Nov. 30, 1983 [DE] Fed. Rep. of Germany ....... 3343299

[51] Int. Cl.$^4$ .............................................. F16L 53/00
[52] U.S. Cl. ..................................... 137/334; 251/327
[58] Field of Search ........................ 137/334, 340, 375; 251/327

[56] References Cited

U.S. PATENT DOCUMENTS

| | | | |
|---|---|---|---|
| 2,029,777 | 2/1936 | Kinnaird | 137/334 |
| 3,136,330 | 6/1964 | Dowling | 137/340 |
| 3,749,114 | 7/1973 | Johnstone et al. | 251/327 |
| 4,112,965 | 9/1978 | Kruschik | 137/334 |
| 4,146,050 | 3/1979 | Graves | 137/375 |
| 4,195,655 | 4/1980 | Augsburger et al. | 137/334 |

FOREIGN PATENT DOCUMENTS 3011369 11/1980 Fed. Rep. of Germany .

Primary Examiner—Martin P. Schwadron
Assistant Examiner—Sheri M. Novack

[57] ABSTRACT

A gate valve includes a housing adapted to be installed in a pipeline, the housing having therethrough a flow passage, and a valve member mounted within the housing for movement between a first position, whereat the valve member closes the flow passage, and a second position, whereat the valve member opens the flow passage. The housing and valve member have axially spaced pairs of adjacent annular surfaces cooperating to define seals when the valve member is in the closed position. The housing has therein, adjacent one annular surface thereof defining at least one seal, a duct. Cooling air is introduced into this duct. The one annular surface of the housing has therein structure defining a gap for directing the cooling air from the duct against the respective annular surface of the valve member when closed or into the flow passage when the valve member is open.

4 Claims, 4 Drawing Figures

GATE VALVE HAVING INTERNAL COOLING STRUCTURE

BACKGROUND OF THE INVENTION

The present invention relates to a gate valve for use in closing and opening fluid flow through a pipeline having a large diameter or nominal width, particularly a pipeline having passing therethrough a high temperature fluid such as hot blast. The present invention particularly is directed to such a gate valve including an air cooled housing and a damper or valve member movable therein between closed and open positions, the housing and valve member having surfaces or seats which cooperate in the closed position of the valve member to form air tight seals, there being a cooling gap in the area of the air seal seat of the housing that opens into the interior of the housing.

A gate valve of this general type is disclosed in West German DE-OS No. 30 11 369 and includes a cooling gap formed by a spring-loaded auxiliary frame in the valve gate housing that cooperates with corresponding sealing strips or with a supplementary joint ring of the valve member. This arrangement however results in a very complex gate valve design, not only because of the necessary auxiliary frame and sealing strips coacting therewith, but also due to the considerable amount of space required by these supplementary components. Additionally, this known arrangement has the drawback that the cooling air flowing through the cooling gap must be injected into the hot blast pipeline of the hot blast furnace, even if the plant is shut down, in order to prevent overheating as a result of radiation from refractory materials. This leads to an undesirable cooling of the refractory elements, and also makes repair work on the pipeline impossible. An even further disadvantage of this known arrangement is the fact that the main heat load is applied to the so-called "six o'clock" angular area of the gate valve, i.e. that area thereof which is first opened upon movement of the valve member from the closed position to the open position. Due to the differential pressure that arises when the valve member is initially moved from the closed position toward the open position, the hot gas flows at high velocity through the crescent-shaped gap that first forms in such "six o'clock" angular area. This often leads to thermal shock, thereby resulting in damage to the gate valve.

SUMMARY OF THE INVENTION

With the above discussion in mind, it is the primary object of the present invention to provide a gate valve of the above discussed general type, but which may be constructed to have minimal dimensions, and including a housing which at all times, even if the plant is shut down as well as during the operation of opening the gate valve, is provided with a high degree of cooling of the seat surfaces forming air tight seals.

This object is achieved in accordance with the present invention by the provision of a gate valve including a gate valve housing to be installed in a pipe line and having therethrough a flow passage, and a valve member mounted within the housing for movement between a first position, whereat the valve member extends across and closes the flow passage, and a second position, whereat the valve member is laterally spaced from the flow passage, thereby opening the flow passage. The housing and valve member have axially spaced pairs of adjacent annular surfaces cooperating to define seals when the valve member is in the closed position. The housing has therein adjacent one annular surface thereof defining at least one seal, a duct. Means is provided for introducing a gas, for example cooling air, into the duct. The one annular surface of the housing has therein an opening structure for directing the gas from the duct against the respective annular surface of the valve member when the valve member is in the closed position thereof, or into the flow passage when the valve member is in the open position thereof. Thus, the duct in the housing is connected to a source of gas, for example cooling air, and opens into the interior of the housing, i.e. the flow passage, through an opening or openings formed in that annular sealing surface which defines an air seal when the valve member is in the closed position.

The housing duct may be provided with means for retarding the gas and thereby for causing the gas to pass uniformly through the opening structure. In a preferred arrangement of the present invention the duct extends through the housing annularly around the flow passage, and the opening structure comprises a continuously annular gap defined in the respective annular sealing surface.

The gas preferably is a cooling gas such as cooling air, and in accordance with a further feature of the present invention, the valve member has around the outer periphery thereof an annular duct, and means is provided for introducing a cooling gas, such as cooling air, into this annular duct and thereby cooling the annular sealing surfaces of the valve member.

In the open position of the valve member, the cooling air is lead into the interior of the housing, i.e. into the duct therein, and thereby through the gap into the hot blast line. Therefore, not only is the seat of the housing which defines the seal surfaces cooled, but also those portions of the housing defining the interior thereof, i.e. a trough in the housing for accommodating the valve member in the closed position, and a hood or housing member for accommodating the valve member in the open position, also are cooled.

In the closed position of the valve member, the cooling gap in the annular surface defining the seal in the housing is covered by a cooperating sealing surface of the valve member. In this manner, the stream of cooling air is interrupted from passing through the cooling gap. However, the cooling air supplied into the annular duct in the valve member can participate in the cooling of the air seal seat surfaces of the housing, since the heat load in this area of the housing is small when the valve member is closed.

When the valve member is open, the cooling air passes through the cooling gap and flows into the interior of the housing. This occurs as soon as the valve member commences movement from the closed position. Thus, the flow of hot blast is interrupted such that only cooling air initially flows through the so-called "six o'clock" angular area or opening between the housing and valve member. This will prevent the formation of cracks due to thermal shock in this area of the gate valve.

The gate valve according to the present invention thereby involves a relatively simple and space-saving structure that does not require any moving, elastic or spring-loaded elements. The cooling opening or gap need not be continuous, but rather may be formed to be annularly discontinuous. The cooling air supplied to the cooling duct in the housing can be supplied either through a single inlet or through plural inlets, preferably spaced annularly around the housing. Advantageously, the line supplying the cooling air to the single or plural branches can be closed by one or more shut-off valves.

In gate valves having two axially spaced and opposed air-seal housing seats, it is possible in accordance with the present invention to provide air cooling arrangements for each sealing seat.

BRIEF DESCRIPTION OF THE DRAWINGS

Other objects, features and advantages of the present invention will be apparent from the following detailed description of a preferred embodiment thereof, with reference to the accompaying drawings, wherein.

DETAILED DESCRIPTION OF THE INVENTION

Figures 1, 2:
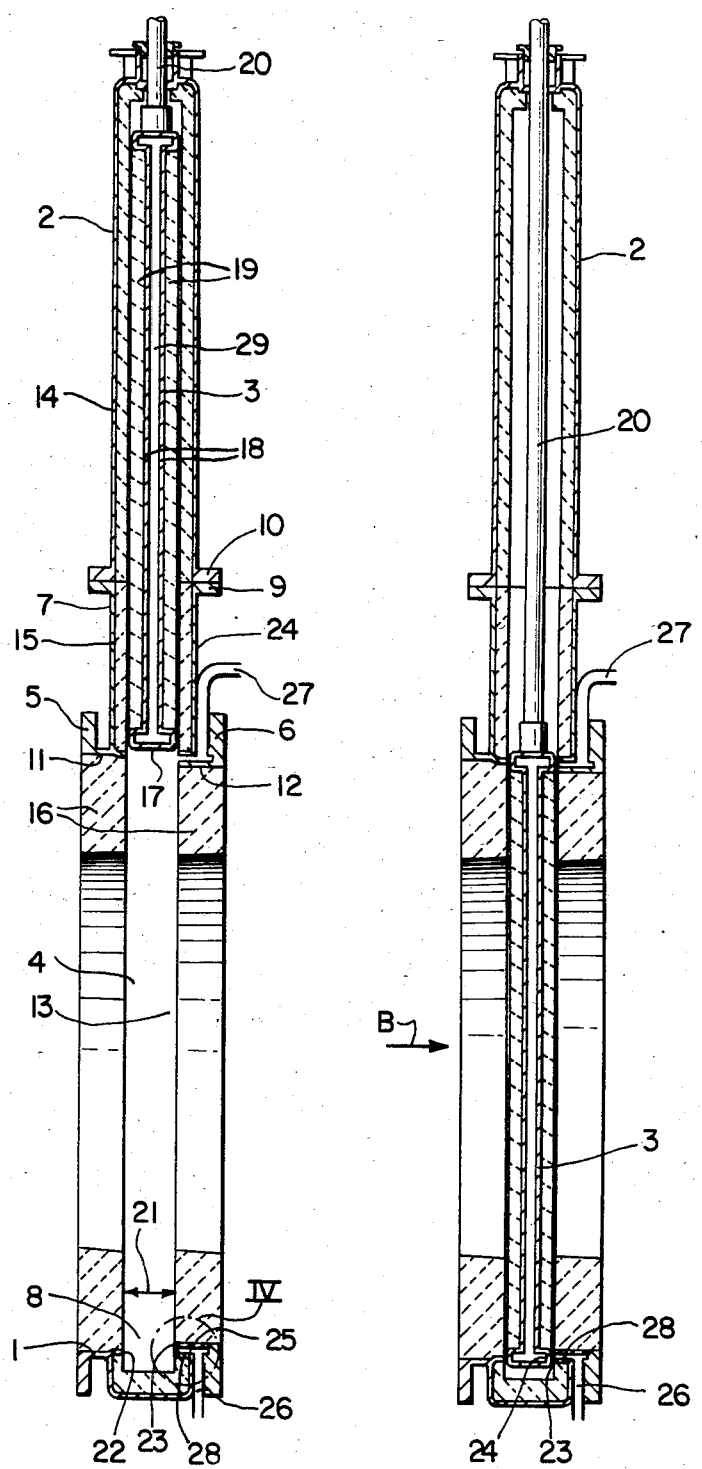
FIG. 1 is a cross-sectional view of a gate valve for use in a hot blast line of a hot blast furnace, the gate valve being shown in the open position.
FIG. 2 is a view similar to FIG. 1, with the gate valve being shown in the closed position.

The gate valve shown in the drawings includes a housing formed by connected elements 1, 2. The housing portion 1 has therethrough a flow passage 13, generally circular in shape. A damper or valve member 3 is mounted within the housing for sliding movement between a closed position, shown in FIG. 2, wherein the valve member 3 extends across and closes flow passage 13, and an open position shown in FIG. 1, whereat the valve member 3 is laterally spaced from the flow passage 13, thereby opening the flow passage. The housing part 1 is provided with axially spaced annular flanges 5 and 6 for mounting the gate valve in a pipeline, not shown. The housing part 1 also includes, axially between mounting flanges 5, 6, a housing like element 7 which is joined at the top portion thereof with housing part 2 to house the valve member 3 in the open position. Housing part 7 is rectangular in the cross section of FIGS. 1 and 2 and includes a semicircular portion defining a trough or recess 8 which accommodates the valve member in the closed position. Housing parts 1, 2 are connected by suitable flanges 9, 10. The housing part 7 is connected to mounting flanges 5, 6 by respective tubular rib portions 11, 12. These portions together define the flow passage 13. The inner walls of housing part or hood 2 are provided with refractory linings 14. Similarly, the interior walls of housing portion 7 are provided with refractory linings 15 which continue within the housing from refractory linings 14. Furthermore, tubular members 11, 12 and respective mounting flanges 5, 6 have formed inwardly thereof refractory linings 16 spaced axially by an amount to accommodate passage therebetween of the valve member 3.

The damper or valve member 3 includes an annular peripheral section 17 defining therein an annular duct and two cover plates closing the interior of such duct. Plates 18 are covered and protected by refractory linings 19. Valve member 3 is moved between the open and closed positions shown in FIGS. 1 and 2 by suitable means, for example two drive shafts 20 connected to the valve member and extending through housing part 2, such shafts being operated by suitable drive means, not shown.

The housing part 1 has two axially spaced annular surfaces 22, 23 cooperating with respective axially spaced annular surfaces 24 of portion 17 of valve member 3 to define seals when the valve member 3 is in the closed position of FIG. 2. The distance 21 between the axially opposed surfaces 22, 23 of tubular connecting ribs 11, 12 or between the respective refractory linings 16 thereof is chosen such that valve member 3 can move therebetween in a manner to define the necessary seals.

The annular end surface 23 forms an air-seal housing seat which, in the closed position of FIG. 2, cooperates with corresponding annular sealing surface 24 of valve member 3. In order to cool the seat or surface 23, an annular duct 25 is provided in the housing adjacent tubular rib 12. Annular duct 25 is supplied with cooling air via at least one, and preferably plural peripherally spaced ducts 26, 27. Annular duct 25 opens into the interior of the housing 1 through a continuous annular gap or slot 28 formed in the seat or surface 23.

Figure 4:
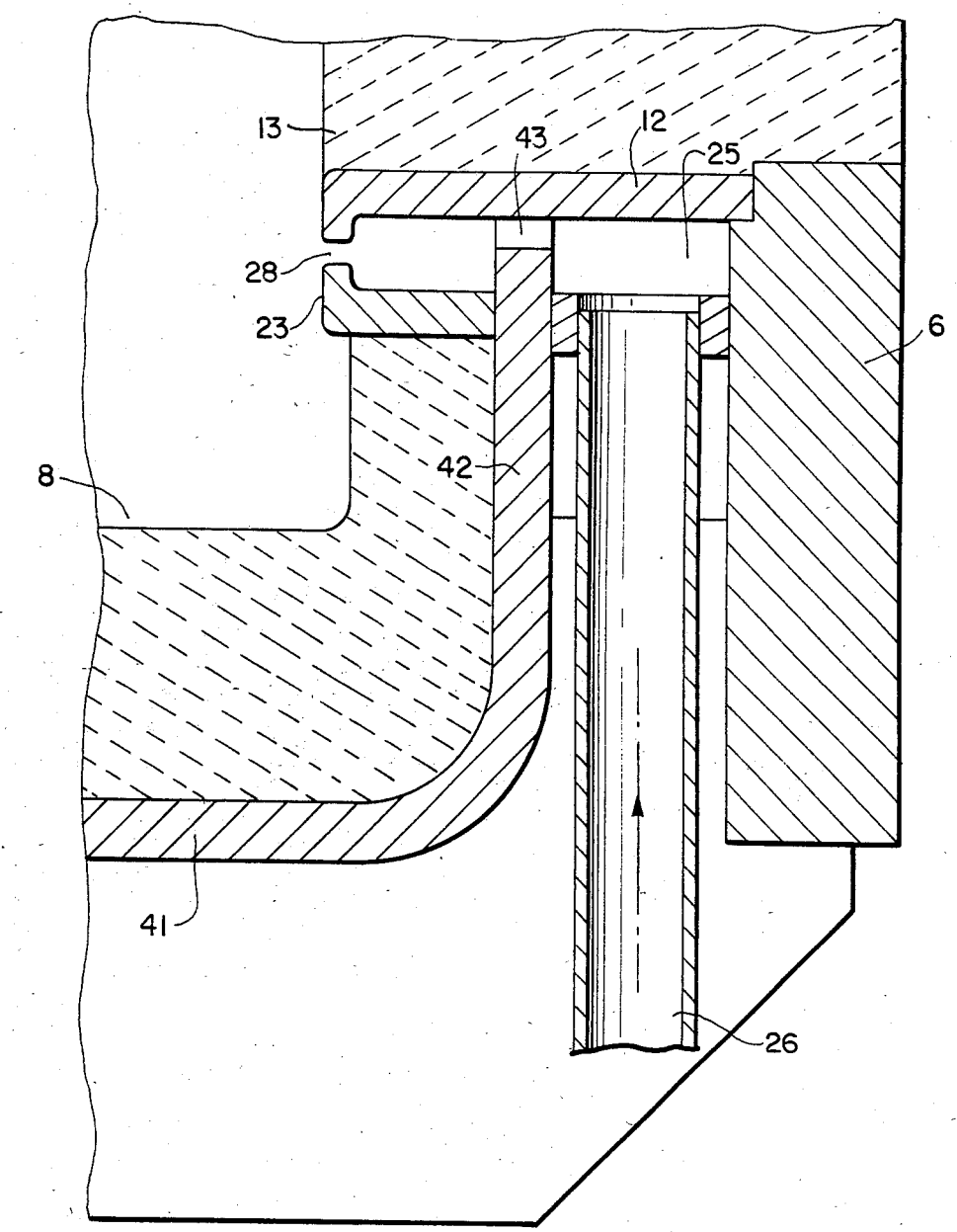
FIG. 4 is an enlarged cross-sectional view of the detail IV of FIG. 1.

As will be apparent from FIG. 4, the trough 8 of the housing is defined by a generally U-shaped member 41 having a leg 42 extending into annular duct 25 and having therein at least one slotted recess 43 that acts as a back pressure forming or pressure accumulation orifice plate. This makes it possible to ensure that the cooling air introduced into duct 25 passes through the air gap 28 at identical discharge velocity at all positions around the gap 28. It will be understood to those skilled in the art that structures to achieve this function other than the illustrated orifice plate may be provided.

Figure 3:
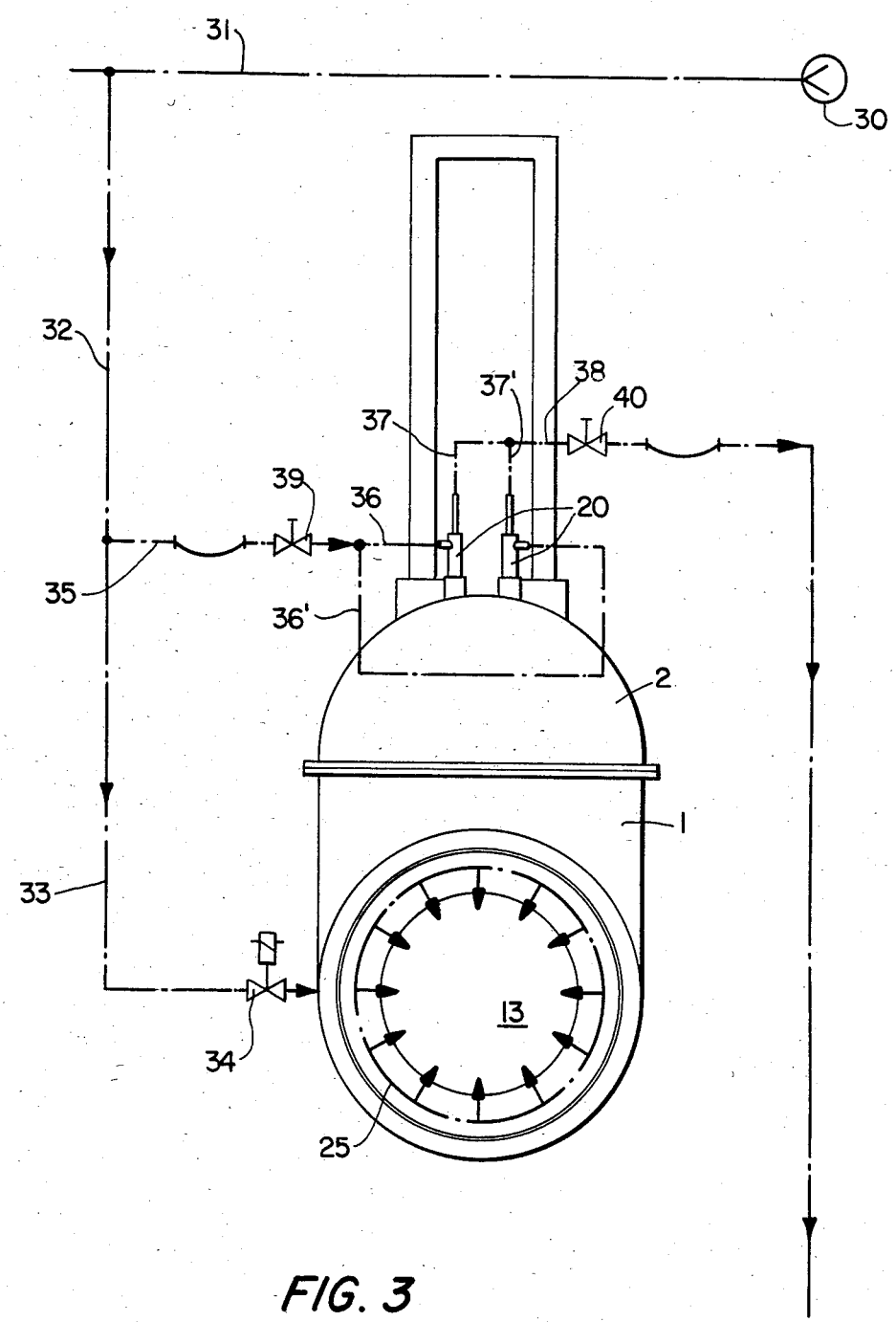
FIG. 3 is a schematic view of the gate valve and also of cooling air supply lines therefor and control and switching elements provided therein.

The damper or valve member 3 has defined therein an air cooled inner chamber 29. Cooling air is supplied into and discharged from chamber 29 by means of tubular driving shafts 20. As seen in FIG. 3, cooling air is supplied, for example by a compressor 30, and is fed to the gate valve by a line 31, 32. The cooling air then travels through a line 33 having a shut-off valve 34 to inlets 26, 27 (not shown in FIG. 3) leading to annular duct 25 of the housing. As shown by the radially inwardly directed arrows in FIG. 3, this air flows into the interior of the housing and into the hot blast line of the installation. Cooling air also is passed by lines 35, 36, 36' and tubular driving shafts 20 to the interior chamber 29 of the valve member 3 (not shown in FIG. 3). This air becomes heated within chamber 29 and is discharged through hollow members extending through shafts 20 and then lines 37, 37' to line 38. Shut-off valves 39, 40 may be provided in lines 35, 38, respectively.

The operation of the illustrated apparatus now will be described.

In the open position shown in FIG. 1, cooling air flows via inlets 26, 27 into annular duct 25 and then is lead through cooling gap 28 into the interior of the housing part 1. As a result, the housing seat or surface 23 is cooled. At the same time, the cooling air passing through cooling gap 28 prevents overheating of the trough 8 in the lower portion of the housing and of the hood or part 2 at the upper portion of the housing. This cooling air then passes to the hot blast line.

In the closed position shown in FIG. 2, the cooling gap 28 is fully covered and blocked by the seat or surface 24 of the valve member 3. The stream of cooling air then is blocked from exiting through cooling gap 28. However, the cooling air introduced into the interior of the valve member operates to cool surface 23, since the heat load at surface 23 and rib 12 is small when the valve is closed.

When the valve member 3 first commences movement from the closed position of FIG. 2, the cooling gap 28 adjacent the so-called "six o'clock position" first is opened. In other words, when starting opening of the gate, the gap 28 adjacent the bottom of the gate valve shown in the drawings is opened while the remainder of the gap still is closed. The cooling air then accumulated in duct 25 adjacent gap 28 immediately enters the area of trough 8. This cooling air thus blocks the flow of hot blast attempting to enter such area. By this manner of operation, the so-called "six o'clock" angular area, which is known to be subject to the greatest destruction in prior art arrangements, is protected from the hot blast. Accordingly, cracks in the structure resulting from thermal shock are prevented.

As shown in FIG. 3, the cooling arrangements for both the housing and the valve member are supplied from a common air compressor 30 at a pressure sufficient to overcome the tendency of the hot blast to enter the area of trough 8 when the valve member first is moved from the closed position.

The cooling air flowing through lines 31, 32, 33 to duct 25 eventually is passed to the interior of the installation and therefore contributes toward the energy requirement for heating the hot blast. If necessary, for instance when the hot blast furnace is to be shut down, it is possible to stop the supply of cooling air from passing into the hot blast line by means of valve 34.

In the illustrated and above described arrangement, the valve member 3 is pressure-loaded by the hot blast in the direction of arrow B, thereby forming a tight seal between surfaces 23, 24. It is possible, within the scope of the present invention, to design the opposed end surface 22 of tubular rib 11 as an air cooled seat and to provide the latter with a cooling arrangement similar to that of surface 23 described above.

Furthermore, although the gap 28 is described as being continuous, it also is possible in accordance with the present invention to design gap 28 as annularly discontinuous or as a rim of spaced apart air outlet openings. Preferably, the width of gap 28 will be approximately 4 to 12 mm, dependent upon the required quantity of cooling air.

Although the present invention has been described and illustrated with respect to preferred features thereof, it is to be understood that other changes and modifications may be made thereto, as will be understood by those skilled in the art, without departing from the scope of the present invention.

We claim:

1. A gate valve for use in closing and opening fluid flow through a pipeline of large diameter, particularly a pipeline having passing therethrough a high temperature fluid such as hot blast, said gate valve comprising:
   a gate valve housing adapted to be installed in a pipeline, said housing having therethrough a flow passage;
   a valve member mounted within said housing for movement between a first position, whereat said valve member extends across and closes said flow passage, and a second position, whereat said valve member is laterally spaced from said flow passage, thereby opening said flow passage;
   said housing and said valve member having axially spaced pairs of adjacent annular surfaces cooperating to define seals when said valve member is in said first position;
   said housing having therein, adjacent one said annular surface thereof defining at least one said seal, a duct, said duct extending through said housing annularly around said flow passage;
   means for introducing a cooling gas into said duct;
   said one annular surface of said housing having therein opening means for cooling said annular surface of said housing by directing said gas from said duct against the entire respective said annular surface of said valve member when said valve member is in said position thereof, or into said flow passage when said valve member is in said second position thereof; and
   said seal formed between said annular surfaces of said housing and said valve member closing said opening means and preventing discharge therethrough of any of said gas when said valve member is in said first position thereof.

2. A gate valve as claimed in claim 1, further comprising means in said duct for retarding said gas and thereby for causing said gas to pass uniformly through said opening means.

3. A gate valve as claimed in claim 1, wherein said opening means comprises a continuously annular gap in said one annular surface.

4. A gate valve as claimed in claim 1, wherein said valve member has around the outer periphery thereof an annular duct, and further comprising means for introducing a cooling gas into said annular duct and thereby cooling said annular surfaces of said valve member.

* * * * *